United States Patent
Yoshida et al.

(10) Patent No.: US 6,679,078 B2
(45) Date of Patent: Jan. 20, 2004

(54) VARIABLE DISPLACEMENT COMPRESSORS AND METHODS FOR CONTROLLING THE SAME

(75) Inventors: Hiroyuki Yoshida, Kariya (JP); Masahiro Kawaguchi, Kariya (JP); Ryo Matsubara, Kariya (JP); Satoshi Umemura, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/283,462

(22) Filed: Oct. 30, 2002

(65) Prior Publication Data

US 2003/0094008 A1 May 22, 2003

(30) Foreign Application Priority Data

Nov. 2, 2001 (JP) ........................................ 2001-337948

(51) Int. Cl.[7] .............................. F25B 1/00; F25B 49/00
(52) U.S. Cl. ...................... 62/228.3; 62/229; 417/222.2
(58) Field of Search ................................. 62/228.3, 229, 62/228.5; 417/222.2, 222.1, 213, 269, 270; 74/60

(56) References Cited

U.S. PATENT DOCUMENTS

| | | | | |
|---|---|---|---|---|
| 5,205,718 A | * | 4/1993 | Fujisawa et al. ......... | 417/222.2 |
| RE35,672 E | * | 11/1997 | Taguchi ................... | 417/222.2 |
| 5,873,704 A | * | 2/1999 | Ota et al. ................ | 417/222.2 |
| 6,056,513 A | * | 5/2000 | Kawaguchi et al. ..... | 417/222.1 |
| 6,179,572 B1 | * | 1/2001 | Taguchi ................... | 417/222.2 |
| 6,212,893 B1 | | 4/2001 | Ban et al. .................... | 62/117 |
| 6,263,687 B1 | | 7/2001 | Ban et al. ................. | 62/228.3 |
| 6,374,625 B1 | | 4/2002 | Fujii et al. ................ | 62/228.3 |

FOREIGN PATENT DOCUMENTS

| | | |
|---|---|---|
| JP | 08-058357 | 3/1996 |
| JP | 11-101514 | 4/1999 |
| JP | 11-301256 | 11/1999 |

* cited by examiner

Primary Examiner—Marc Norman
(74) Attorney, Agent, or Firm—Woodcock Washburn LLP

(57) ABSTRACT

Variable displacement compressors (101) include a displacement control valve (181) that is in communication with a drive chamber (111). The output displacement of the compressor varies in response to changes in pressure within the drive chamber. A controller (203) may control the displacement control valve so that the pressure within the drive chamber is maintained within a predetermined range. Further, the predetermined range may be determined based upon one or more factors that cause fluctuations in the pressure within the drive chamber during operation of the compressor.

18 Claims, 5 Drawing Sheets

FACTORS THAT INCREASE IN PRESSURE Pc WITHIN DRIVE CHAMBER 111

① INCREASE IN ENVIRONMENTAL TEMPERATURE (DUE TO OPERATING ENVIRONMENT)

② DECREASE IN INPUT VOLTAGE TO BLOWER 320 (DUE TO SWITCHING OF FLOW RATE PERFORMED BY OPERATOR)

③ INCREASE IN ROTATIONAL SPEED OF COMPRESSOR 101 (DRIVE SHAFT 151)

CORRELATION BETWEEN ENVIRONMENTAL TEMPERATURE AND Pd MAXIMUM VALUE

CORRELATION BETWEEN ENVIRONMENTAL TEMPERATURE AND PRESSURE Pc

VARIABLE DISPLACEMENT COMPRESSORS AND METHODS FOR CONTROLLING THE SAME

This application claims priority to Japanese patent application serial number 2001-337948, the contents of which are incorporated herein by reference.

BACKGROUND OF THE INVENTION

1. Technical Field

The present invention relates to variable displacement compressors. More particularly, the present invention relates to techniques for suitably controlling the pressure within a drive chamber of a variable displacement compressor.

2. Description of the Related Art

U.S. Pat. No. 6,212,893 teaches an air conditioning system that includes a variable displacement compressor, a cooling circuit, a heating circuit, a displacement control valve and a controller. The cooling circuit includes a condenser, a first expansion valve and an evaporator, which are disposed within a circuit extending from an outlet of the compressor to an inlet of the compressor. Therefore, highly pressurized refrigerant is discharged from the compressor and is then drawn into the compressor via the elements in the circuit line. The refrigerant is repeatedly circulated through the air conditioning system in order to perform a cooling operation.

The heating circuit includes a bypass path that connects the outlet to the evaporator. The heating circuit also includes a second expansion valve disposed within the bypass path and the above-described evaporator. Therefore, high temperature and highly pressurized refrigerant discharged from the compressor may be drawn into the compressor via the second expansion valve and the evaporator without being circulated to the condenser. This cycle also may be repeatedly performed in order to perform a heating operation. In general, this type of heating circuit is known as "hot gas heater." By opening and closing a switching valve, switching between the cooling circuit and the heating circuit can be performed.

The displacement control valve is disposed within a communication path between the outlet for the pressurized refrigerant and a drive chamber defined within a housing of the compressor. The controller serves to open the displacement control valve in order to increase the pressure within the drive chamber when the pressure of the discharged refrigerant exceeds a reference value.

SUMMARY OF THE INVENTION

However, if the displacement control valve is actuated so as to open when the pressure of the discharged refrigerant exceeds the reference value, the pressure within the drive chamber may unintentionally increase excessively, if the environmental temperature is relatively high or the amount of refrigerant remaining within the heating circuit is relatively large. Therefore, the pressure within the drive chamber may exceed a durable limit pressure of a sealing mechanism, such as a seal lip, that communicates with the drive chamber. The drive chamber will more likely exceed the durable limit pressure when the heating circuit is operated rather than when the cooling circuit is operated, because the discharge pressure of the refrigerant during the operation of the heating circuit is normally higher than the discharge pressure of the refrigerant during the operation of the cooling circuit.

Therefore, pressure control techniques have been developed so as to maintain the pressure within the drive chamber within a predetermined range, thereby ensuring the durability of the lip seal even during the operation of the heating circuit. As a result, the pressure within the drive chamber can be adjusted to an appropriate pressure (or appropriate pressure range) in view of the durability of the lip seal by appropriately varying the maximum discharge pressure (i.e., a reference value for the discharge pressure) based upon pressure fluctuation factors, such as environmental temperature.

Therefore, it is one object of the present invention to teach improved techniques for suitably controlling the pressure within the drive chamber of a variable displacement compressor, which includes a displacement control valve for controlling refrigerant output displacement.

According to one aspect of the present teachings, variable displacement compressors are taught that may include a displacement control valve that is in communication with a drive chamber. The refrigerant output displacement of the compressor generally varies in response to changes in pressure within the drive chamber. A controller may actuate the displacement control valve in order to maintain the pressure within the drive chamber within a predetermined range. The predetermined range may be determined based upon factors that cause fluctuations in the pressure within the drive chamber during the operation of the compressor. For example, such factors may include, e.g., the environmental temperature of the compressor, the temperature of an air conditioning circuit associated with the compressor, and the driving speed, i.e., the rotational speed of the compressor.

In another aspect of the present teachings, the compressors may include parts or devices, e.g. a sealing device for a drive shaft, which communicate with the drive chamber. Such parts or devices may have a durable limit pressure. That is, if the pressure within the drive chamber exceeds a certain pressure, such parts may be damaged and operation of the compressor may deteriorate. Therefore, by appropriately actuating the displacement control valve such that the pressure within the drive chamber does not exceed the durable limit pressure of the target part or device, the present compressors can reliably operate without applying excessive pressure to the target part or device.

In another aspect, the compressors may include a discharge chamber that communicates with the drive chamber via the displacement control valve. In this case, a refrigerant may be compressed within the compressor and then may be delivered or supplied to the drive chamber via the displacement control valve. The controller may select a reference value for the pressure of the discharged refrigerant based upon the nature of the pressure fluctuation factors and changes in the values of the pressure fluctuation factors. Therefore, the displacement control valve may be controlled or actuated based upon such a reference value.

According to another aspect of the present teachings, air conditioning systems are taught that include one of the variable displacement compressors that include the above features.

According to another aspect of the present teachings, methods for controlling variable displacement compressors are taught that may include, e.g., (1) determining a predetermined pressure range for a drive chamber defined within the variable displacement compressor based upon one or more factors that may possibly cause (excessive) pressure fluctuations within the drive chamber and (2) actuating a displacement control valve, which communicates with the drive chamber, in order to maintain the pressure within the drive chamber within the predetermined pressure range.

BRIEF DESCRIPTION OF THE DRAWINGS

Additional objects, features and advantages of the present invention will be readily understood after reading the following detailed description together with the claims and the accompanying drawings, in which:

DETAILED DESCRIPTION OF THE INVENTION

Figure 1:
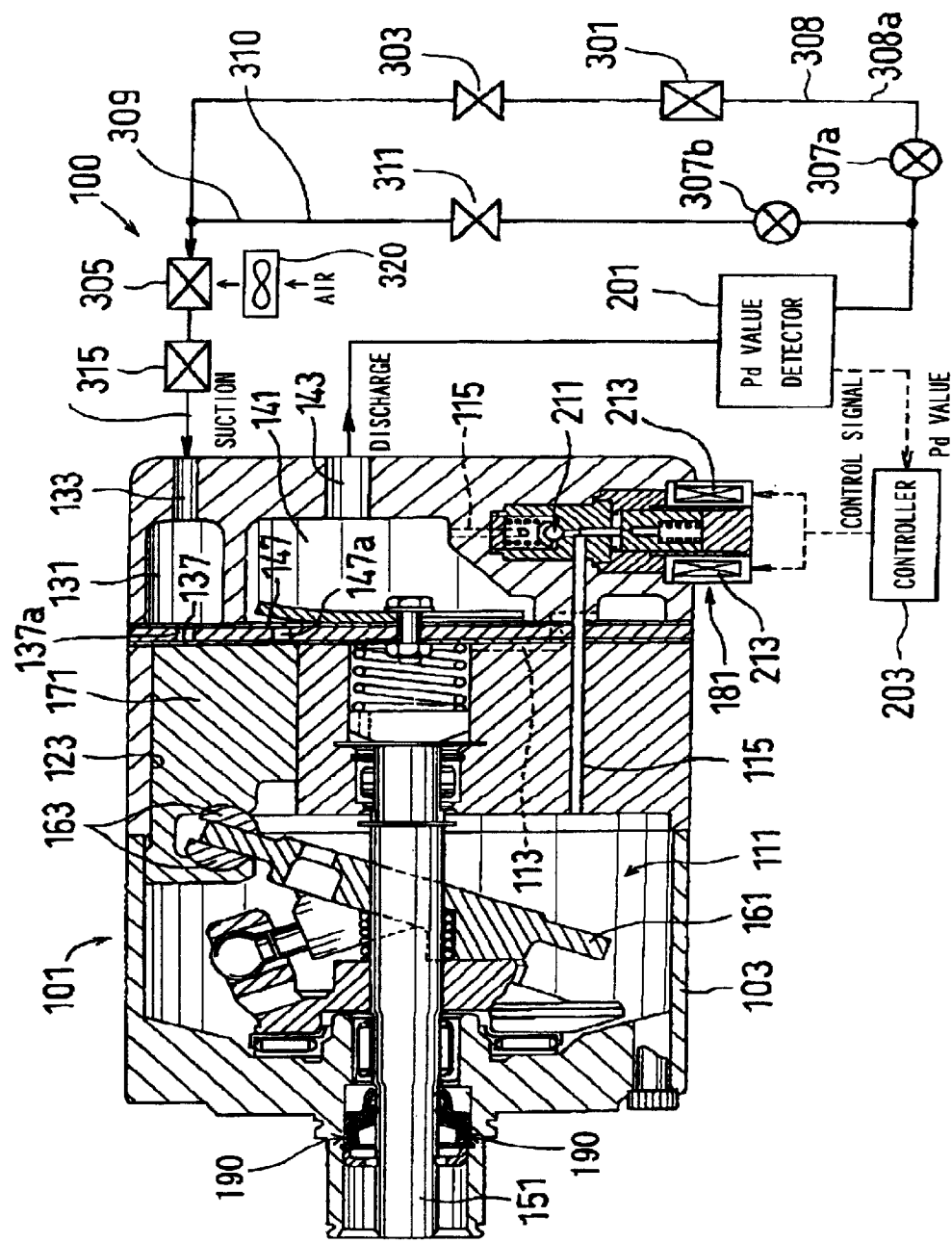
FIG. 1 is a schematic plan view of a representative air conditioning system 100.

In one embodiment of the present teachings, variable displacement compressors may include a drive chamber, a suction chamber, a discharge chamber, a displacement control valve and a controller. The controller preferably include, e.g., a processor or microcomputer that is programmed to execute a pressure increase prevention program.

A refrigerant may be drawn into the compressor via the suction chamber, then highly compressed within the compressor and discharged to an air conditioning circuit via the discharge chamber. The refrigerant may primarily include a refrigerant, although lubricating oil also may be dispersed within the refrigerant in order to lubricate sliding parts within the compressor. The compressors also may include one or more piston(s) that is (are) received within one or more cylinder bore(s). The suction, compression and discharge operations may be performed as the piston(s) reciprocate(s). The piston may be coupled to a swash plate that is mounted on a drive shaft, so that the piston(s) reciprocate(s) within the cylinder bore(s) as the drive shaft rotates. The output discharge ratio of the refrigerant may be varied by actuating or controlling of the displacement control valve. A portion of the discharged refrigerant may be delivered or supplied to the drive chamber via the displacement control valve in order to influence the inclination angle of the swash plate relative to the drive shaft. By changing the inclination angle, the stroke length of the piston and the output discharge ratio of the refrigerant can be changed.

The controller may control or actuate the displacement control valve based upon information concerning one or more pressure fluctuation factors that may cause fluctuations in pressure within the drive chamber. Therefore, the pressure within the drive chamber is preferably maintained within a predetermined range. Herein, "information concerning a pressure fluctuation factor" may include the pressure within the drive chamber itself, as well as more generally, any other parameter that may influence fluctuations in pressure within the drive chamber, or any other information that may suggest such parameters. Other representative pressure fluctuation factors may include, e.g., the environmental temperature of the air conditioning circuit and the rotational speed of the compressor (i.e., the rotational speed of the drive shaft rotatably driven within the compressor).

Therefore, by utilizing one or more pressure fluctuation factors to control the displacement control valve, the pressure within the drive chamber may be maintained within the predetermined range, even if one or more of the pressure fluctuation factors, such as the environmental temperature, changes during the operation of the compressor. Herein, the term "predetermined range" is preferably a range between a predetermined maximum set value and a predetermined minimum set value of the pressure with the drive chamber, a range that is less than a predetermined maximum set value, or a range that is greater than a predetermined minimum set value. For example, such a range may be selected based upon the durability of the lip seal (shaft sealing device) that communicates with the drive chamber. In this case, the pressure within the drive chamber may be maintained within the range that does not exceed the durable limit pressure of the lip seal. Consequently, the pressure within the drive chamber of the variable displacement compressor can be effectively maintained within the desired range.

In another embodiment of the present teachings, the controller may calculate a reference value for the discharged refrigerant pressure in response to information concerning the pressure fluctuation factor(s). The controller may then control the displacement control valve based upon the reference value. Thus, the displacement control valve may be controlled (activated and deactivated) by using the reference value that was selected to suitably maintain the pressure within the drive chamber within the predetermined range. Such a reference value may be uniquely determined based on the information concerning the pressure fluctuation factor(s). For example, a map may provide a correlation between the information concerning the pressure fluctuation factor(s) and reference values for the discharge pressure. The information concerning the pressure fluctuation factor(s) may be read as needed in order to renew or reset the reference value. Thus, the reference value may vary according to changes in the information concerning the pressure fluctuation factor(s).

For example, if the pressure within the drive chamber will be maintained within the range that is less than the predetermined maximum value, the reference value of the discharge pressure may be set to enable such control. Then, the displacement control valve may be controlled with reference to the set reference value. For example, the set reference value may be compared with the actual discharged refrigerant pressure. If the actual discharged refrigerant pressure is higher than the set reference value, the current supplied to the displacement control valve may be reduced in order to maintain the drive chamber within the desired pressure range. According to known techniques, the reference value for the discharge pressure was set to a uniform value regardless of pressure fluctuation factors. Therefore, the pressure within the drive chamber could not be suitably controlled. However, according to the present teachings, the pressure within the drive chamber can be finely or precisely controlled (maintained) within the predetermined pressure range by varying the reference value for the discharge pressure in response to changes in the pressure fluctuation factor(s).

In another embodiment of the present teachings, the pressure fluctuation factor(s) is (are) selected from at least one of the environmental temperature of the air conditioning circuit and the rotational speed of the compressor (drive shaft). Thus, one of these factors or a combination of two or more of these factors can be used to control the displacement control valve.

For example, if the environmental temperature increases, the temperature of the air that is supplied from a blower to an evaporator with the air conditioning circuit will increase. Consequently, the temperature and pressure of the refrigerant that is drawn into the compressor via the inlet may increase and the discharged refrigerant pressure and the pressure within the drive chamber may increase. A temperature sensor, such as a temperature sensor that is typically provided in a vehicle, can be used to detect the environmental temperature. Thus, the detected value output by the temperature sensor can be used in the control program or process for the displacement control valve.

If the temperature of the air conditioning circuit increases, the temperature and pressure of the refrigerant that is drawn into the compressor via the inlet may increase and the discharged refrigerant pressure and the pressure within the drive chamber may increase. For example, the temperature of the evaporator may be utilized as the temperature of the air conditioning circuit for this embodiment. In this case, a temperature sensor may be coupled to the evaporator in order to detect the temperature of the evaporator. However, any other parameter that represents the temperature of the evaporator or the air conditioning system may be used. For example, the voltage input to the blower, which supplies air to the evaporator, may be used. The voltage input to the blower may vary when the operator of the vehicle changes an air flow rate switch associated with the blower.

If the rotational speed of the compressor (i.e., the drive shaft) increases, the temperature of the compressor and the compressor housing may increase. In this case, the pressure of the refrigerant that is drawn into the compressors via the inlet may increase and the discharged refrigerant pressure and the pressure within the drive chamber may increase. The rotational speed of the compressor may be obtained by detecting the rotational speed of the vehicle engine and calculating the rotational speed of the drive shaft of the compressor from the detected speed.

Thus, the operation of the present variable displacement compressors may be controlled by using the environmental temperature of the air conditioning circuit and/or the rotational speed of the compressor as a pressure fluctuation factor.

In another embodiment of the present teachings, the variable displacement compressors may include a sealing device that communicates with the drive chamber. The sealing device may seal a portion of the compressor that communicates with the drive chamber between the inside and outside of the compressor housing. For example, the sealing device may be a shaft sealing device having a lip seal that contacts the drive shaft of the compressor. In this case, the predetermined pressure range may be determined based upon the durability of the sealing device. For example, the displacement control valve may be controlled so that the pressure within the drive chamber does not exceed the durable pressure limit value of the sealing device. As a result, the sealing device may be suitable protected from damage caused by excessive pressure increases within the drive chamber.

In another embodiment of the present teachings, an air conditioning system may include a variable displacement compressor having one or more of the above-described features. The air conditioning system may include a cooling circuit and/or a heating circuit. The cooling circuit may include a condenser and an evaporator. The condenser may be disposed within a communication path extending from the outlet to the inlet. The evaporator may be disposed within the communication path on the downstream side of the condenser.

The heating circuit may include a bypass path and the above-noted evaporator. The bypass path may extend from the outlet to the evaporator. In this case, the evaporator may be used for both the cooling circuit and the heating circuit. The controller may control the displacement control valve so that pressure within the drive chamber is maintained within a predetermined range or maintained at a predetermined value. Naturally, the controller may utilize one or more pressure fluctuation factors selected from at least one of the environmental temperature of the evaporator and the rotational speed of the compressor in order to control the displacement control valve.

In another embodiment of the present teachings, methods for controlling variable displacement compressors are taught. The methods may include controlling the displacement control valve based upon information concerning one or more pressure fluctuation factors, so that the pressure within the drive chamber is maintained within a predetermined range. Therefore, the pressure within the drive chamber can be effectively controlled within the predetermined range. Optionally, the controller may determine a reference value of the discharged refrigerant pressure in response to the information concerning the pressure fluctuation factor(s). The controller may control the displacement control valve based upon the reference value. Therefore, by changing the reference value for the discharged refrigerant pressure in response to the information concerning the pressure fluctuation factor(s), the pressure within the drive chamber can be precisely controlled.

As noted above, the present methods may include controlling the displacement control valve based upon one or more pressure fluctuation factors selected from at least one of the environmental temperature of the evaporator and the rotational speed of the compressor. In addition or in the alternative, the present methods may include determining the predetermined pressure range of the drive chamber based upon the durability of one or more sealing devices that communicate(s) with the drive chamber. Therefore, the sealing device(s) within the compressors may be suitably protected from damage.

Each of the additional features and teachings disclosed above and below may be utilized separately or in conjunction with other features and teachings to provide improved variable displacement compressors and air conditioning systems and methods for designing and using such compressors and systems. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 2:
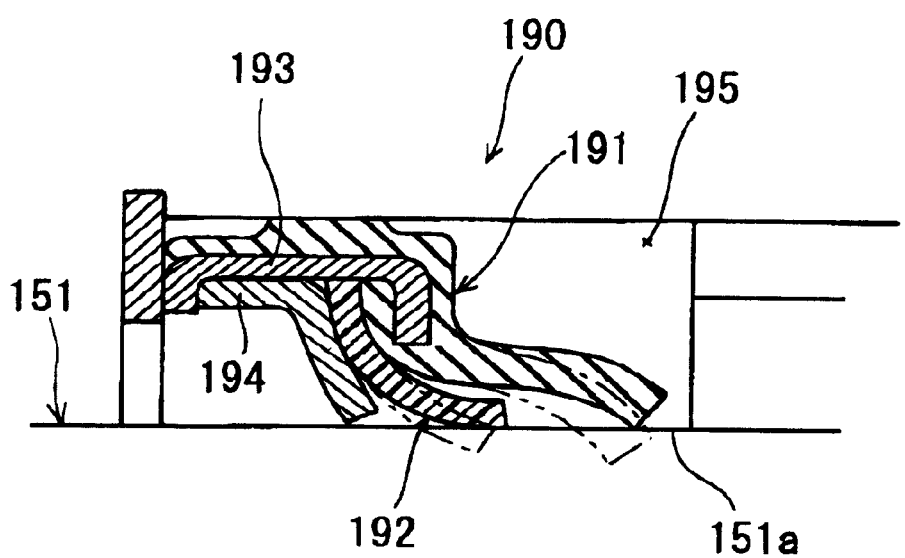
FIG. 2 is an enlarged view of a portion of a representative swash-plate type variable displacement compressor 101, which is an element of the representative air conditioning system 100.

A representative air conditioning system 100 will now be described with reference to the drawings. The air conditioning system 100 may be adapted to be installed within a vehicle, such as an automobile, and may include a variable displacement compressor 101 that is operable to draw, compress and highly pressurize, and discharge a refrigerant. In this representative embodiment, the variable displacement compressor 101 is a swash plate-type compressor. The representative air conditioning system 100 is schematically shown in FIG. 1. FIG. 2 shows an enlarged view of a portion of the variable displacement compressor 101.

Referring to FIG. 1, the air conditioning system 100 may include a cooling circuit 308, a heating circuit (hot gas bypass heater circuit) 309 and a controller 203 in addition to the compressor 101. Although not shown in the drawings, a drive shaft 151 of the compressor 101 may be coupled to a vehicle engine as an external drive source for rotatably driving the drive shaft 151. For example, the drive shaft 151 may be coupled to the vehicle engine via a clutch mechanism, such as an electromagnetic clutch (not shown).

The cooling circuit 308 of the air conditioning system 100 may be operated with a supply of highly pressurized refrigerant that has been compressed by the compressor 101. The cooling circuit 308 may include a condenser 301, a first expansion valve 303, an evaporator 305 and an accumulator 315. The heating circuit (hot gas bypass heater circuit) 309 also may be operated with a supply of high temperature and highly pressurized refrigerant that has been compressed by the compressor 101. The heating circuit 309 may include a second expansion valve 311 disposed within a bypass path 310 that is arranged to communicate the refrigerant (that has been discharged from an outlet 143 of the compressor 101) to the evaporator 305. In addition, the heating circuit 309 may include the evaporator 305 and the accumulator 315, thereby sharing these elements with the cooling circuit 308. Optionally, the evaporator 305 may be used in combination with a hot water heater (not shown), to which cooling water (e.g., antifreeze) from the vehicle engine is circulated.

Still referring to FIG. 1, a first valve 307a and a second valve 307b may serve to selectively operate either the cooling circuit 308 or the heating circuit 309. A Pd value detector 201 may detect the pressure Pd of the discharged refrigerant and may input a detected Pd value to the controller 203. Preferably, the controller 203 may be constructed as a control unit that includes at least a CPU, a ROM, a RAM and I/O interfaces (not shown). The Pd value detector 201 may preferably be coupled to a displacement control valve 181 via the controller 203.

The air conditioning system 100 also may include a blower (fan) 320 that serves to supply air to the evaporator 305 in order to generate cooled air that will be supplied to the interior of a vehicle cabin. For example, the blower 320 may be a centrifugal fan. In addition, the blower 320 may be driven by a DC motor (not shown) and current is supplied from a battery (not shown) installed in the vehicle to the DC motor. Therefore, by adjusting the input voltage to the DC motor, the output (wind force) of the blower 320 may be varied.

During the operation of the cooling circuit 308, the refrigerant, which has been compressed and highly pressurized by the compressor 101, may be delivered or supplied to the condenser 301. The heat of the high temperature refrigerant may then be discharged to the outside at the condenser 301, thereby causing the refrigerant to liquefy. Thereafter, the refrigerant may be decompressed (expanded) at the first expansion valve 303 and may be delivered or supplied to the evaporator 305, where the refrigerant draws heat from the outside, i.e. the environmental air, and becomes a gas. The gasified refrigerant may then return to the compressor 101 via the accumulator 315 so as to be further circulated. During the operation of the heating circuit 309, the high temperature and highly pressurized refrigerant (that has been compressed within the compressor 101) may be decompressed (evaporated) at the second expansion valve 311 and then may be delivered or supplied to the evaporator 305, where the refrigerant discharges heat to the outside. During the operation of the heating circuit 309, the refrigerant circulates while always being maintained in a gaseous phase. The heating circuit 309 is generally known as "hot gas bypass heater circuit."

In this representative embodiment, the heating circuit 309 is utilized as an auxiliary heating device. Thus, during the operation of the heating circuit 309, the heat produced at the evaporator 305 is used as an auxiliary heat source for the hot water heater described above. In this case, the heating circuit 309 may provide supplemental heat if the heat supplied from the engine cooling water is not sufficient to heat the cabin space, e.g., when the engine is started or when the environmental temperature is low (such as −20° C. or below).

The construction of the compressor 101 that supplies the compressed refrigerant (refrigerant) to the cooling circuit 308 and the heating circuit 309 will now be described. The compressor 101 may include a drive chamber 111 defined within housing 103. A swash plate 161 may be disposed within the drive chamber 111 and may be supported by a drive shaft 151. The swash plate 161 may rotate with the drive shaft 151 while the swash plate 161 is inclined relative to the drive shaft 151. The inclination angle of the swash plate 161 relative to the drive shaft 151 is adjustable. In this specification, the positions of the swash plate 161 relative to the drive shaft 151 will be hereinafter referred to as a "substantially upright position" when the swash plate 161 is inclined to substantially the upright (i.e., substantially vertical or perpendicular) position relative to the drive shaft 151 and a "substantially parallel position" which the swash plate 161 is disposed substantially in a horizontal position relative to the drive shaft 151.

The peripheral portion of the swash plate 161 may be joined or attached to the heads of pistons 171 via movable shoes 163. In this representative embodiment, six pistons 171 may be disposed around the drive shaft 151 and six cylinder bores 123 may slidably receive the respective pistons 171 in order to enable the pistons 171 to move in the right and left directions as viewed in FIG. 1. As the swash plate 161 rotates with the drive shaft 151 while the swash plate 161 is inclined as shown in FIG. 1, the peripheral portion of the swash plate 161 may slide relative to the pistons 171 via the shoes 163. As shown in FIG. 1, when any one of the pistons 171 is positioned so as to oppose to a first part of the peripheral portion of the swash plate 161, which first part is the nearest to the corresponding cylinder bore 123, such piston 171 may be inserted into the corresponding cylinder bore 123 to reach its deepest position. On the contrary, when the piston 171 is positioned to oppose to a second part of the peripheral portion of the swash plate 161, which second part is the furthest from the corresponding cylinder bore 123 and is the lowest as viewed in FIG. 1, the piston 171 may be withdrawn from the corresponding cylinder bore 123 to reach its shallowest position. The shallowest position of the piston 171 may be attained when the drive shaft 151 rotates by an angle of 180° from the position shown in FIG. 1. Therefore, the piston 171 may reciprocate one time in the right and left directions within the cylinder bore 123 during one rotation of the drive shaft 151.

A suction hole 137a and a discharge hole 147a may be defined at the bottom of each cylinder bore 123. A suction valve 137 and a discharge valve 147 may be positioned to respectively oppose to the suction hole 137a and the discharge hole 147b. The suction hole 137a may communicate with a suction chamber 131. The discharge hole 147a may communicate with a discharge chamber 141. As the piston 171 moves in the left direction as viewed in FIG. 1 due to the rotation of the swash plate 161, the refrigerant may be drawn into the compressor 101 through an inlet 133 and may then flow into the cylinder bore 123 via the suction chamber 131, the suction hole 137a and the suction valve 137. On the other hand, as the piston 171 moves in the right direction as viewed in FIG. 1 due to the rotation of the swash plate 161, the refrigerant drawn into the cylinder bore 123 may be compressed to be highly pressurized and then may be discharged through the outlet 143 via the discharge hole 147a, the discharge valve 147 and discharge chamber 141. The volume of refrigerant that is discharged generally depends upon the stroke length of the piston 171 and the stroke length of the piston 171 varies in response to the inclination angle of the swash plate 161. Thus, as the swash plate 161 approaches the "substantially parallel position" or the maximum inclination angle, the stroke length of the piston 171 becomes greater to increase the discharge volume. On the contrary, as the swash plate approaches the "substantially vertical position" or the minimum inclination angle, the stroke length of the piston 171 becomes smaller to decrease the discharge volume.

In the representative compressor 101, the suction chamber 131 may communicate with the drive chamber 111 via a pressure-reduction channel 113. Further, the discharge chamber 141 may communicate with the drive chamber 111 via a pressure supply channel 115. A displacement control valve 181 may be disposed in the middle of the pressure supply channel 115 and may be an electromagnetic valve that includes a valve member 211 and a solenoid 213. Therefore, the pressure supply channel 115 may be opened and closed through excitation and non-excitation of the solenoid 213. More specifically, the solenoid 213 may include a coil (not shown), to which the controller 203 supplies power that corresponds to drive signals inputted to the controller 203. Therefore, the solenoid 213 may generate an electromagnetic force, the magnitude of which corresponds to the amount of power supplied to the coil. As a result, the opening degree of the pressure supply channel 115 may be determined in response to the electromagnetic force. Preferably, the operation of the displacement control valve 181 may be controlled in response to the amount of current supplied to the coil.

The inclination angle of the swash plate 161 is generally determined by the pressure difference across the pistons 171 (i.e., the difference between the pressure within the drive chamber 111 and the pressure within the cylinder bores 123). By opening and closing the displacement control valve 181, the pressure difference may be controlled or changed. In order to reduce the discharge volume, the displacement control valve 181 may be opened to deliver refrigerant within the discharge chamber 141 to the drive chamber 111, so that the pressure within the drive chamber 111 may be increased. Then, the swash plate 161 may incline toward the "substantially vertical position" to decrease the stroke length of the piston 171 and to thereby reduce the discharge volume. On the contrary, in order to increase the discharge volume, the displacement control valve 181 may be closed to prevent the refrigerant within the discharge chamber 141 from flowing into the driving chamber 111. Because the drive chamber 111 communicates with the suction chamber 131 via the pressure-reduction channel 113, the pressure within the drive chamber 111 may be reduced, so that the swash plate 161 may be inclined toward the "substantially parallel position". As a result, the stroke length of the piston 171 may be increased to increase the discharge volume.

As shown in FIG. 1, a shaft sealing device 190 may be disposed around the drive shaft 151. As shown in more detail in FIG. 2, the shaft sealing device 190 may include a first lip 191 and a second lip 192 that contact a circumferential (peripheral) surface 151a of the drive shaft 151. The shaft sealing device 190 also may include retainers 193 and 194. Preferably, the first lip 191 may be made of rubber and may disposed on the side of the drive chamber 111. The second lip 192 may be made of polytetrafluoroethylene, which is also known as "TEFLON®." Moreover, the second lip 192 may be disposed between the first lip 191 and the retainer 194. Preferably, the retainers 193 and 194 may be made of metal. The retainer 193 may serve to retain the first lip 191 and the retainer 194 may serve to retain the second lip 192. A space 195 may be defined on the side of the outer periphery of the first lip 191 and may communicate with the drive chamber 111. Therefore, the refrigerant within the drive chamber 111 may be delivered to the space 195 so as to apply pressure against the first lip 191.

In a non-loaded state prior to mounting the shaft sealing device 190, the first lip 191 and the second lip 192 may have the configurations that are respectively indicated by chain lines in FIG. 2. Upon mounting the shaft sealing device 190 onto the drive shaft 151, the peripheral surface 151a of the drive shaft 151 may press the first lip 191 and the second lip 192 so as to have the configurations that are respectively indicated by solid lines in FIG. 2. In the mounted state, the tightening forces of the first lip 191 and the second lip 192 may be applied to the peripheral surface 151a of the drive shaft 151 in order to create a seal between the inside and outside of the compressor housing. Therefore, the refrigerant within the drive chamber 111 may be prevented from leaking to the outside of the compressor housing along the peripheral surface 151a of the drive shaft 151. Thus, the shaft sealing device 190, in particular the first lip 191 and the second lip 192, may serve to seal the drive shaft 151.

The controller 203 of the air conditioning system 100 may have an additional function to prevent inappropriate or excessive pressure increases within the drive chamber 111. In this representative embodiment, the controller 203 may be designed to control the displacement control valve 181 by taking into account the durability of the shaft sealing device 190. Thus, the controller 203 may control the displacement control valve 181 such that the pressure Pc within the drive chamber 111 does not exceed the durable limit pressure of the shaft sealing device 190. In this specification, this process will be hereinafter referred to as "pressure Pc increase prevention control" or "process for preventing excessive pressure Pc increases."

Before describing the control performed by the controller 203 in further detail, various factors (hereinafter called "pressure increase inducing factors") that may induce pressure increases within the drive chamber 111 will be described with reference to FIG. 3.

Figure 3:
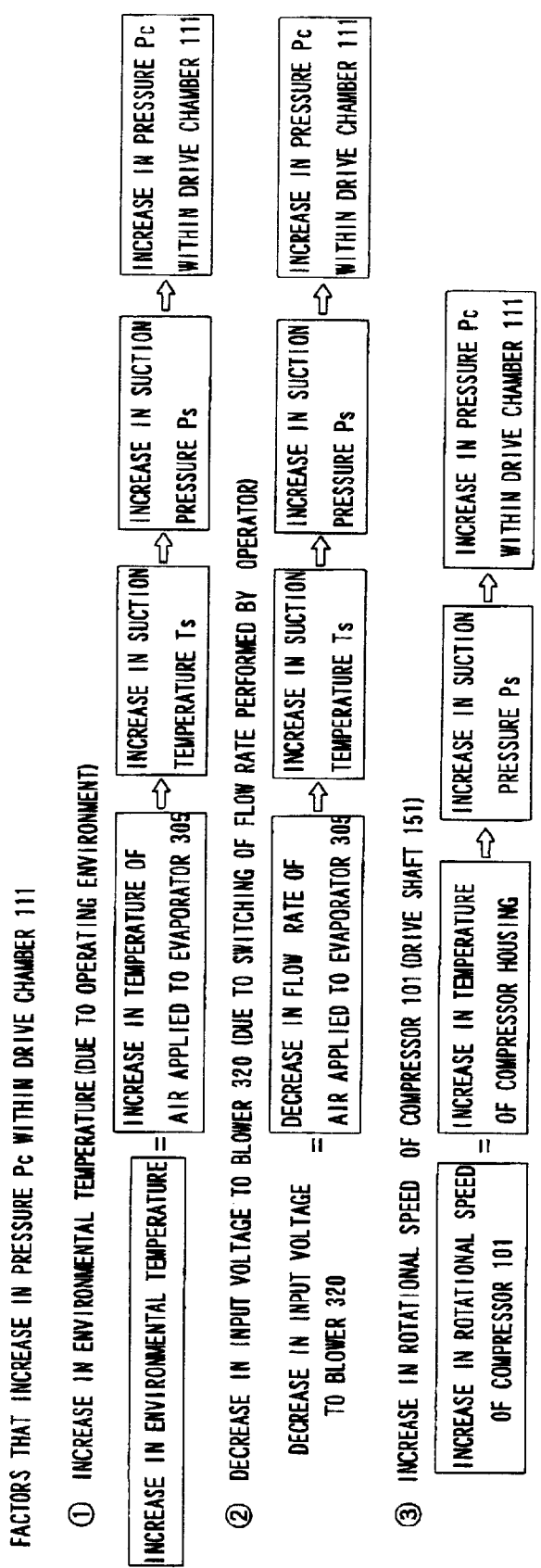
FIG. 3 is a chart describing various factors that may cause an increase in pressure within a drive chamber 111 of the variable displacement compressor.

As shown in FIG. 3, the "pressure increase inducing factors" may include factors that cause pressure fluctuations within the drive chamber 111 and may include, e.g., (1) the environmental temperature, (2) the input voltage supplied to the blower 320 and (3) the rotational speed of the compressor 101 (i.e., the rotational speed of the drive shaft 151). Naturally, other factors are also contemplated.

For example, if the environmental temperature has increased due to a change in the working environment, the temperature of the air supplied from the blower 320 to the evaporator 305 may be increased. Therefore, the temperature Ts (hereinafter called "suction temperature Ts) as well as the pressure Ps (hereinafter called "suction pressure Ps") of the refrigerant drawn into the compressor 101 via the inlet 133 may be increased. In this case, the pressure Pd (hereinafter called "discharge pressure Pd") of the discharged refrigerant and the pressure within the drive chamber 111 may increase.

On the other hand, if the operator adjusts a switch (not shown) associated with the blower 320 in order to reduce the air flow rate supplied into the vehicle cabin, the input voltage supplied to the blower 320 may be decreased. In this case, the flow rate of the air supplied from the blower 320 to the evaporator 305 will decrease. As a result, the suction temperature Ts and suction pressure Ps of the refrigerant drawn into the compressor 101 via the inlet 133 may be increased, thereby increasing the discharge pressure Pd and the pressure within the drive chamber 111.

Further, if the rotational speed of the compressor 100 increases (i.e., the rotational speed of the drive shaft 151 increases), the temperature of the compressor 100 itself may be increased, thereby causing an increase in the temperature of the compressor housing 103. In this case, the suction pressure Ps of the refrigerant drawn into the compressor 100 via the inlet 133 may be increased. As a result, the discharge pressure Pd and the pressure within the drive chamber 111 may be increased.

Figure 4:
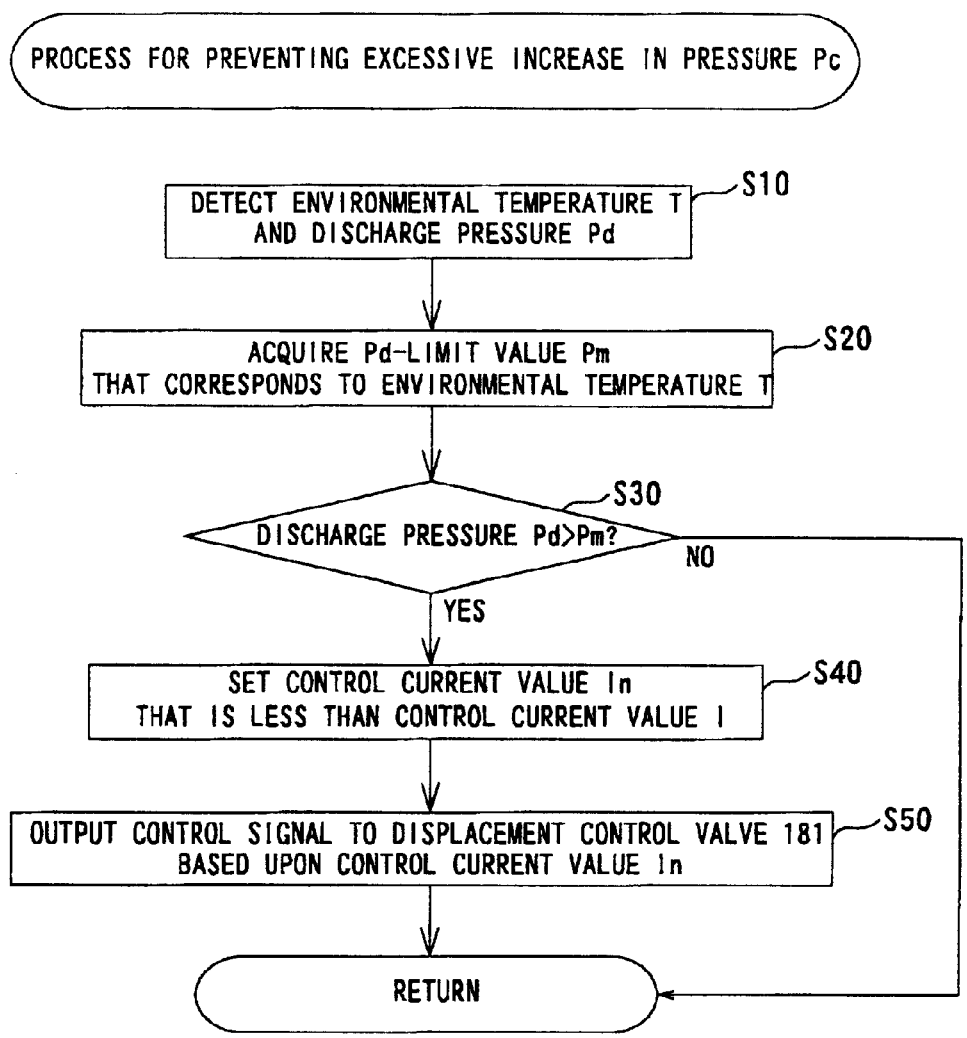
FIG. 4 is a flowchart of a process for preventing pressure (Pc) increases within the drive chamber 111, which process steps may be executed by a controller.
Figure 5:
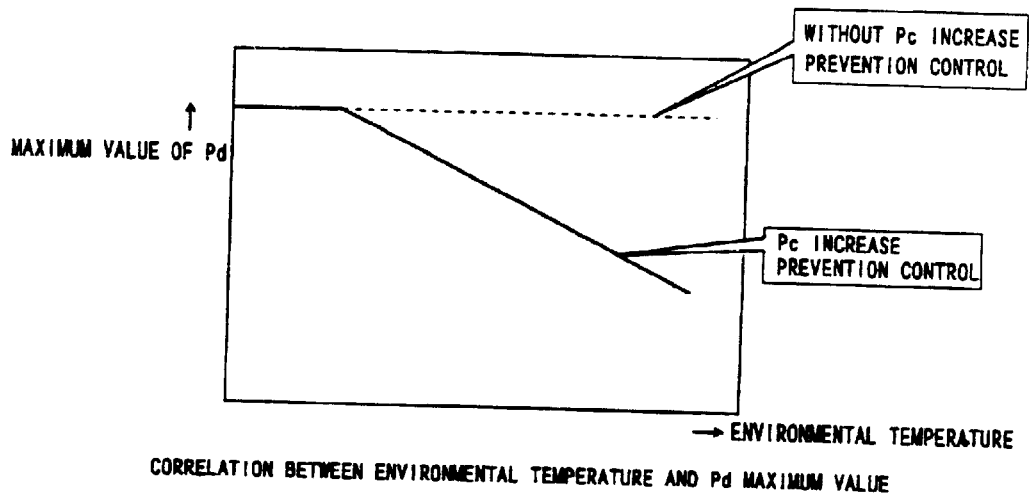
FIG. 5 is a graph showing the correlation between environmental temperature T and a maximum pressure (Pd) value.
Figure 6:
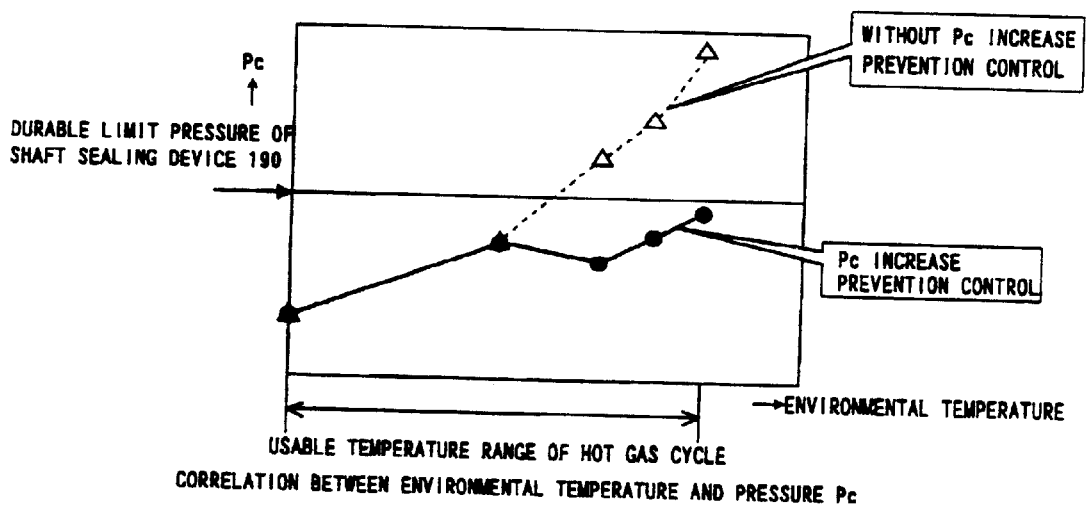
FIG. 6 is a graph showing the correlation between environmental temperature T and the pressure Pc within the drive chamber 111.

The Pc pressure increase prevention control that may be performed by the controller 203 will now be described with reference to FIGS. 4 to 6 in connection with a process that utilizes the environmental temperature as a pressure increase factor. FIG. 4 shows a flowchart of the process performed by the controller 203. FIG. 5 depicts a graph showing the correlation between the environmental temperature and the maximum pressure Pd. FIG. 6 shows the correlation between the environmental temperature and pressure Pc.

As shown in FIG. 4, initially, in Step S10 of the Pc increase prevention control, the CPU of the controller 203 reads out the environmental temperature T and the discharge pressure Pd. For example, the environmental temperature T may be detected by utilizing a temperature sensor (not shown) that is usually installed within the vehicle. Thus, the CPU may read the result of detection by the temperature sensor. The Pd value detector 201 may detect the discharge pressure Pd.

The process then proceeds to Step 20 to acquire the Pd maximum value Pm that corresponds to environmental temperature T detected in Step S10. As described above, the Pd maximum value Pm may vary with changes of environmental temperature T, and may be re-determined every time that the environmental temperature T is detected. In this specification, the Pd maximum value Pm also may be referred to as a "discharge pressure reference value." For example, a map (not shown) may be prepared for determining the Pd maximum value Pm based upon the current environmental temperature T and the Pd maximum value Pm can be acquired from the map. It is possible that the refrigerant within the heating circuit 309 to be charged into the cooling circuit 308 is not, in fact, charged into the cooling circuit 308 and remains entirely within the heating circuit 309, even when the operation of the air conditioning system 100 has been changed from the cooling circuit 308 to the heating circuit 309. Therefore, the Pd maximum value Pm may be determined such that the pressure Pc within the drive chamber 111 will not exceed the durable limit pressure of the shaft sealing device 190, even in such an occasion. Step S30 and the subsequent steps may be performed in order to control the displacement control valve 181 in accordance with the Pd maximum value Pm.

In Step S30, the CPU compares the discharge pressure Pd read in Step S10 with the Pd maximum value Pm acquired in Step S20. If the discharge pressure Pd is greater than the Pd maximum value Pm (i.e., if the determination in Step S30 is YES), the process proceeds to Step S40. On the contrary, if the discharge pressure Pd is equal to or smaller than the Pd maximum value Pm (i.e., if the determination in Step S30 is NO), the process stops in order to terminate the Pc increase prevention control. In the latter case, the controller 203 may execute normal control in order to control the output discharge rate based upon the operational load.

In Step S40, the CPU reads a control current value I that is currently supplied to the displacement control valve 181. The CPU then determines a control current value In that is less than the control current value I (In=I−ΔI). The process then proceeds to Step S50, in which the CPU outputs control signals to the displacement control valve 181 based upon the control current value In in order to prevent the pressure Pc within the drive chamber 111 from increasing beyond the Pd maximum limit value Pm.

Referring to FIG. 5, the Pc increase prevention control performed according to the representative embodiment is shown in comparison with a process in which Pc increase prevention control is not performed (i.e., the Pd maximum limit value Pm is maintained at a uniform value irrespective of changes in the environmental temperature). Thus, in this representative embodiment, the Pd maximum limit value Pm decreases as the environmental temperature increases. The inventors have verified that the Pc increase prevention effect as shown in FIG. 6 can be attained by the representative embodiment. Thus, if Pd maximum limit value Pm is maintained at a uniform value during operation of the compressor 101, the pressure Pc within the drive chamber 111 may exceed the durable limit pressure (that is previously determined in response to the durable performance of the shaft scaling device 190) as the environmental temperature increases. On the other hand, the Pc increase prevention control according to the representative embodiment ensures that the pressure Pc is maintained within a pressure range that does not exceed the durable limit pressure.

As described above, according to the representative embodiment, the shaft sealing device 190 can be protected to ensure proper sealing function, because the displacement control valve 181 is controlled based upon the environmental temperature (which is one of the factors that may cause fluctuations in pressure Pc within the drive chamber 111) such that the pressure within the drive chamber 111 does not exceed the durable limit pressure of the shaft sealing device 190.

The present invention is not limited to the above representative embodiment, but may include various applications and modifications. For example, the following embodiments may be realized by applying the teachings of the above representative embodiment.

The above representative embodiment has been described in connection with the control of the displacement control valve 181 by utilizing the environmental temperature as one pressure increase factor for the drive chamber 111. However, similar control can be performed by utilizing the temperature of the air conditioning system 100, the rotational speed of the compressor 101 and the pressure within the drive chamber 111 and/or any other factor as the pressure increase factor(s).

In addition, the above representative embodiment has been described for preventing the pressure within the drive chamber 111 from exceeding the durable limit pressure of the shaft sealing device 190. However, the control may be performed to prevent the pressure within the drive chamber 111 from exceeding the durable limit pressure of any other devices or elements (i.e., in addition to or instead of the shaft sealing device 190) that are in communication with the drive chamber 111.

What is claimed is:

1. A method for controlling a variable displacement compressor, comprising:
   controlling a displacement control valve in communication with a drive chamber of the variable displacement compressor, so that the pressure within the drive chamber is maintained within a predetermined pressure range, wherein output displacement of the compressor varies in response to changes in pressure within the drive chamber.

2. A method as in claim 1, further comprising determining the predetermined pressure range based upon one or more factors that cause fluctuations in the pressure within the drive chamber during operation of the compressor.

3. A method as in claim 1, wherein the variable displacement compressor further comprises:
   a compressor housing including a suction chamber and a discharge chamber, the suction chamber being arranged and constructed to draw a refrigerant, the discharge chamber being arranged and constructed to discharge compressed refrigerant into an air conditioning circuit, and the drive chamber being defined within the compressor housing, and wherein the displacement control valve is arranged and constructed to control delivery of the compressed refrigerant from the discharge chamber to the drive chamber and
   a controller arranged and constructed to control the displacement control valve based upon information concerning a pressure fluctuation factor, wherein the pressure within the drive chamber is maintained within a predetermined pressure range and the pressure fluctuation factor is a factor that causes pressure fluctuations within the drive chamber during operation of the compressor and
   wherein the method further comprises controlling the displacement control valve based upon information concerning a pressure fluctuation factor, wherein the pressure within the drive chamber is maintained within a predetermined pressure range and the pressure fluctuation factor is a factor that causes fluctuations in pressure within the drive chamber.

4. A method as in claim 3, further including determining a reference value of the pressure of the discharged refrigerant in response to the information concerning the pressure fluctuation factor, and controlling the displacement control valve based upon the reference value.

5. A method as in claim 4, wherein the pressure fluctuation factor is selected from at least one of environmental temperature of the air conditioning circuit, rotational speed of the compressor, temperature of an evaporator or input voltage of a blower.

6. A method as in claim 5, further including determining the predetermined pressure range based upon the durability of a sealing device that communicates with the drive chamber.

7. A method as in claim 1, further including determining the predetermined pressure range based upon the durability of a sealing device that communicates with the drive chamber.

8. A method as in claim 1, further comprising:
   detecting the pressure fluctuation factor of the air conditioning circuit,
   determining whether the detected value of the pressure fluctuation factor is greater than a reference value that corresponds to the pressure fluctuation factor, and
   reducing current supplied to the displacement control valve, thereby controlling the displacement control valve.

9. A method as in claim 8, wherein the pressure fluctuation factor is selected from at least one of environmental temperature of the air conditioning circuit, rotational speed of the compressor, temperature of an evaporator or input voltage of a blower.

10. A variable displacement compressor, comprising:
    a drive chamber defined within a compression housing,
    a suction chamber arranged and constructed to draw a refrigerant,
    a discharge chamber arranged and constructed to discharge compressed refrigerant into an air conditioning circuit,
    a displacement control valve arranged and constructed to control delivery of the compressed refrigerant from the discharge chamber to the drive chamber and
    a controller arranged and constructed to control the displacement control valve based upon information concerning a pressure fluctuation factor, wherein the pressure within the drive chamber is maintained within a predetermined pressure range and the pressure fluctuation factor is a factor that causes pressure fluctuations within the drive chamber during operation of the compressor.

11. A variable displacement compressor as in claim 10, wherein the controller is further arranged and constructed to determine a reference value for the pressure of the discharged refrigerant in response to the information concerning the pressure fluctuation factor, and the controller controls the displacement control valve based upon the reference value.

12. A variable displacement compressor as in claim 11, wherein the pressure fluctuation factor is selected from at least one of environmental temperature of the air conditioning circuit, rotational speed of the compressor, temperature of an evaporator or input voltage of a blower.

13. A variable displacement compressor as in claim 12, further including a sealing device that communicates with the drive chamber, and wherein the predetermined pressure range is determined based upon the durability of the sealing device.

14. A variable displacement compressor as in claim 10, further including a sealing device that communicates with the drive chamber, and wherein the predetermined pressure range is determined based upon the durability of the sealing device.

15. An air conditioning system comprising:
    the variable displacement compressor of claim 10,
    a cooling circuit including a condenser and an evaporator, the condenser being disposed within a communication path extending from the discharge chamber to the suction chamber, and the evaporator being disposed in the communication path on the downstream side of the condenser, and a heating circuit including a bypass path and the evaporator, the bypass path extending from the discharge chamber to the evaporator, wherein the pressure fluctuation factor is selected from at least one of environmental temperature of the evaporator and rotational speed of the compressor.

16. A variable displacement compressor, comprising;

a drive chamber defined within a compressor housing, a displacement control valve in communication with the drive chamber, wherein output displacement of the compressor varies in response to changes in pressure within the drive chamber, and a controller arranged and constructed to control the displacement control valve so that the pressure within the drive chamber is maintained within a predetermined pressure range, wherein the predetermined range is determined based upon one or more factors that cause fluctuations in the pressure within the drive chamber.

17. A variable displacement compressor as in claim 16, further including a sealing device that communicates with the drive chamber, and wherein the predetermined pressure range is determined based upon the durability of the sealing device.

18. An air conditioning system comprising:

the variable displacement compressor of claim 17, the variable displacement compressor further comprising a suction chamber and a discharge chamber in communication with the drive chamber, a cooling circuit including a condenser and an evaporator, the condenser being disposed within a communication path extending from the discharge chamber to the suction chamber, and the evaporator being disposed in the communication path on the downstream side of the condenser, and a heating circuit including a bypass path and the evaporator, the bypass path extending from the discharge chamber to the evaporator, wherein the pressure fluctuation factor is selected from at least one of environmental temperature of the evaporator and rotational speed of the compressor.

* * * * *